US007185029B1

(12) United States Patent
Titus et al.

(10) Patent No.: US 7,185,029 B1
(45) Date of Patent: Feb. 27, 2007

(54) METHOD AND APPARATUS FOR MAINTAINING, AND UPDATING IN-MEMORY COPIES OF THE FIRST AND SECOND POINTERS TO REFERENCE THE NEW VERSIONS OF THE FIRST AND SECOND CONTROL STRUCTURES THAT INDICATE AVAILABLE AND ALLOCATED PORTIONS OF USABLE SPACE IN THE DATA FILE

(75) Inventors: Scott L. Titus, Shakopee, MN (US); Sherry L. Crandall, Hugo, MN (US)

(73) Assignee: Unisys Corporation, Blue Bell, PA (US)

( * ) Notice: Subject to any disclaimer, the term of this patent is extended or adjusted under 35 U.S.C. 154(b) by 511 days.

(21) Appl. No.: 10/607,885

(22) Filed: Jun. 27, 2003

(51) Int. Cl.
  G06F 17/30 (2006.01)
  G06F 17/00 (2006.01)
  G06F 13/28 (2006.01)
(52) U.S. Cl. .................... 707/203; 707/1; 707/10; 707/100; 707/205; 711/142; 711/152; 711/171
(58) Field of Classification Search ............. 707/1–2, 707/8, 200–201, 205–206, 100–101, 10, 707/203; 711/161–163, 168–169, 205–206, 711/170–171, 202, 103, 147–148, 152; 710/200; 369/30.03; 709/215–218
See application file for complete search history.

(56) References Cited

U.S. PATENT DOCUMENTS 4,849,878 A * 7/1989 Roy ........................ 707/200

5,491,818 A * 2/1996 Malatesta et al. .......... 707/201
5,682,497 A * 10/1997 Robinson ................. 711/103

(Continued)

FOREIGN PATENT DOCUMENTS

CA       2279028     *  1/2001

(Continued)

OTHER PUBLICATIONS

Eugene Inseok Chong et al. "a mapping mechanism to support bitmap index and other auxiliary structures on tables stored as primary B+ -trees",SIGMOD record, vol. 32, No. 2, Jun. 2003 pp. 78-88.*

(Continued)

*Primary Examiner*—Srirama Channavajjala
(74) *Attorney, Agent, or Firm*—Charles A. Johnson; Mark T. Starr; Crawford Maunu PLLC (57) ABSTRACT

Method and apparatus for expanding usable space for an application data file. A control file is maintained with control structures that indicate available and allocated portions of usable space in the data file, along with quantities of available space in portions of the data file. Access to the control structures is limited while the file is undergoing expansion. Space is allocated in the control file for new versions of control structures, and the contents of the control structures are copied to the space for the new versions of the control structures. Pointers that reference the control structures and that are maintained in the control file are updated to reference the new versions of the first and second control structures.

13 Claims, 6 Drawing Sheets

U.S. PATENT DOCUMENTS

| | | | | |
|---|---|---|---|---|
| 5,761,456 A * | 6/1998 | Titus et al. | ............ | 710/305 |
| 5,870,764 A * | 2/1999 | Lo et al. | ............ | 707/203 |
| 5,951,657 A * | 9/1999 | Wood et al. | ............ | 710/55 |
| 6,032,216 A * | 2/2000 | Schmuck et al. | ............ | 710/200 |
| 6,094,694 A * | 7/2000 | Hickson et al. | ............ | 710/54 |
| 6,115,716 A * | 9/2000 | Tikkanen et al. | ............ | 707/100 |
| 6,128,621 A * | 10/2000 | Weisz | ............ | 707/103 Y |
| 6,226,728 B1 * | 5/2001 | See et al. | ............ | 711/171 |
| 6,295,539 B1 * | 9/2001 | Isip, Jr. | ............ | 707/201 |
| 6,353,834 B1 * | 3/2002 | Wong et al. | ............ | 707/202 |
| 6,549,901 B1 * | 4/2003 | Loaiza et al. | ............ | 707/7 |
| 6,571,326 B2 * | 5/2003 | Spiegel et al. | ............ | 711/170 |
| 6,728,709 B1 * | 4/2004 | Plasek et al. | ............ | 707/8 |
| 6,751,617 B1 * | 6/2004 | Anfindsen | ............ | 707/8 |
| 6,763,428 B1 * | 7/2004 | Cappon | ............ | 711/112 |
| 6,907,508 B2 * | 6/2005 | Dearth et al. | ............ | 711/173 |
| 6,954,765 B2 * | 10/2005 | Spiegel | ............ | 707/200 |
| 7,013,302 B2 * | 3/2006 | Modelski et al. | ............ | 707/10 |
| 7,092,932 B1 * | 8/2006 | Titus | ............ | 707/2 |
| 2002/0103814 A1 * | 8/2002 | Duvillier et al. | ............ | 707/202 |
| 2003/0220951 A1 * | 11/2003 | Muthulingam et al. | ............ | 707/205 |
| 2004/0068635 A1 * | 4/2004 | Bjork et al. | ............ | 711/171 |
| 2004/0101281 A1 * | 5/2004 | Defrance et al. | ............ | 386/69 |
| 2004/0153479 A1 * | 8/2004 | Mikesell et al. | ............ | 707/200 |
| 2004/0221120 A1 * | 11/2004 | Abrashkevich et al. | ............ | 711/170 |
| 2004/0243535 A1 * | 12/2004 | Bailey | ............ | 707/1 |
| 2005/0038831 A1 * | 2/2005 | Souder et al. | ............ | 707/201 |
| 2005/0235127 A1 * | 10/2005 | Muthiah et al. | ............ | 711/170 |

FOREIGN PATENT DOCUMENTS

| | | | |
|---|---|---|---|
| CA | 2281287 | * | 3/2001 |
| EP | 0871122 | * | 10/1998 |
| WO | WO 03067437 | * | 8/2003 |
| WO | WO 2004077229 | * | 9/2004 |
| WO | WO 2006005623 | * | 1/2006 |
| WO | WO 2006/069126 | * | 6/2006 |

OTHER PUBLICATIONS

Chapter 12, Operating system concepts, Sliberschatz,Galvin Gagne 2002, 9 pages.*

Chanchio,K et al. "memory space representation for heterogeneous networkprocess migration", Parallel processing symposium, 1998, pp. 801-805.*

Hermannsson,G et al. "fast locks in distributed shared memory systems", Proceedings of the hawaii international conference on system sciences, 1994, vol. 1, pp. 574-583.*

Scheerer,D et al. "multi-dimensional locks with on-line allocation schemes", proceedings of the 16 annual conference on distributed computing systems, 1996, pp. 241-248.*

* cited by examiner

METHOD AND APPARATUS FOR MAINTAINING, AND UPDATING IN-MEMORY COPIES OF THE FIRST AND SECOND POINTERS TO REFERENCE THE NEW VERSIONS OF THE FIRST AND SECOND CONTROL STRUCTURES THAT INDICATE AVAILABLE AND ALLOCATED PORTIONS OF USABLE SPACE IN THE DATA FILE

FIELD OF THE INVENTION

The present disclosure generally relates to file management systems.

BACKGROUND OF THE INVENTION

A freespace file, such as that managed by the Freespace database management system from Unisys, supports different record sizes in the same file and permits the file to grow when an application needs additional file space and contract when the application requires less space.

A freespace file is divided into multiple cells that are equal in size. Within the cells, data is organized in units of basic records. Storage for n basic records is available in each cell. Different record types may be defined to satisfy different storage requests, where each record type is defined to be a fixed number of basic records. For example, a first type may be defined by one basic record, a second type by two basic records and so on.

The following information is used to manage a freespace file. Each cell has an associated bit map that tracks which basic records in the cell are allocated and which are available. An index table for a freespace file contains entries that are pointers to the bit maps of the cells of the file. The index table is divided into sections, and each section is stored in persistent storage as a node in a linked list. The entries in each section of the index table reference an associated subset of the cells of the file.

A control file, which is also a freespace file, is used in managing freespace files. The control file contains the same control structures used by other freespace files, along with system-specific control blocks and space that are used to manage all the freespace files.

When a file with the freespace control structure format is made recognizable as a freespace file, or registered with the freespace system, parts of the control structures contained in the freespace file are copied to the freespace control file. At that time, the parts of the control structures that are pointers must be changed in the control file to reference other locations within the control file. The control structures in the freespace file are not changed. A fixed-size index table is also created in the control file for managing the freespace file. The size of the index table that is created in the control file is determined by a value stored in association with the freespace file that indicates the maximum number of cells that may be defined in the file. The fixed-size index table in the control file is populated with pointers to the locations of the file's bit maps in the freespace control file.

Once the file is registered, it may be made available for allocating and releasing records by requesting that the file be brought online. Making the file available causes the operating system to read portions of the file's control structures from the freespace control file into memory. This also causes another control structure to be built for the file in the control file and in memory. This is the Available Record Table (ART). The available-record table that is generated from the bit maps indicates for each cell the number of basic records that are available for allocation. The number of entries in the ART is equal to the number of cells in the file.

If the size of a freespace file is to be increased and the fixed-size index table in the control file is not large enough to accommodate pointers to the new bit maps that are needed, the file is taken offline, deregistered, and access to the file by an application is effectively halted. Thus, a database application using a freespace file would be unable to continue operations on the file. For some applications, any down time is intolerable.

A system and a method that address these and other related problems are therefore desirable.

SUMMARY OF THE INVENTION

The various embodiments of the invention support expanding usable space for an application data file. A control file is maintained with control structures that indicate available and allocated portions of usable space in the data file, along with quantities of available space in portions of the data file. Access to the control structures is limited while the file is undergoing expansion. Space is allocated in the control file for new versions of control structures, and the contents of the control structures are copied to the space for the new versions of the control structures. Pointers that reference the control structures and that are maintained in the control file are updated to reference the new versions of the first and second control structures.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
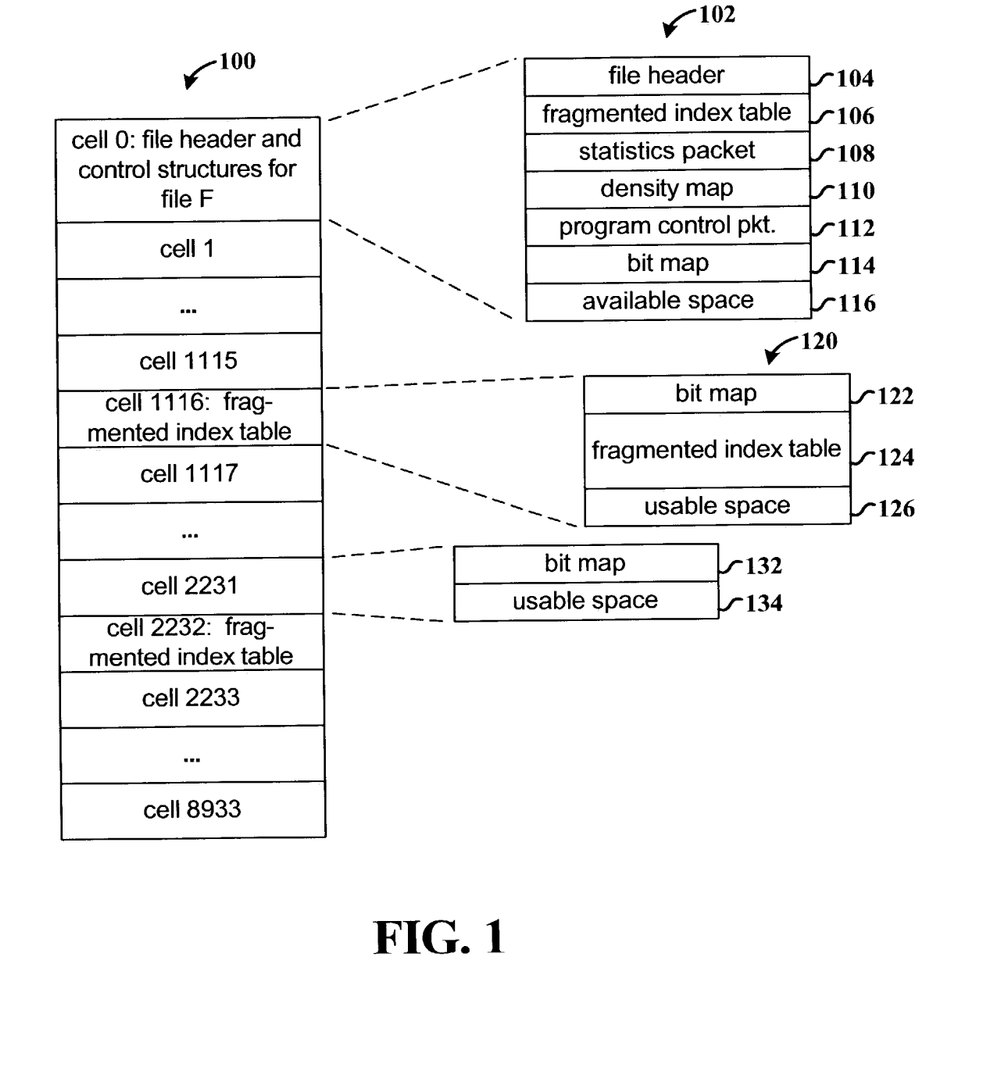
FIG. 1 is a block diagram that illustrates an example logical layout of a file in persistent storage prior to registration as a freespace file.

FIG. 1 is a block diagram that illustrates an example logical layout of a file 100 named, F, in persistent storage prior to registration as a freespace file. Cell 0 contains control structures for file F. The control structures are illustrated in expanded form in block 102. The file header 104 may contain, for example, a file number, a basic record size and a key to the density map record.

The index table for a freespace file is stored in fragments, each fragment referred to as a fragmented index table. The fragmented index table 106 in cell 0 includes index table entries for each of cells 0–1115, and the fragmented index table in cell 1116 includes index table entries for each of cells 1116–2231. The fragmented index tables in others of the cells similarly contain index table entries for a subset of the cells of file F. Each index table entry is a pointer to a bit map that describes an associated cell, where the bit map is stored in the first record of the cell. The fragmented index tables are connected in a linked list.

The statistics packet 108 stores statistics that relate to file activity, for example, the number of records allocated or released by record type.

The density map 110 contains information that defines the structure of the freespace file 100. For example, this information includes definitions of record types, the size of a cell, the number of cells defined for the file, and the record key to find the index table. The record key defines the number of words in the record and the location of the record within the file. Even though the location of the index table in the freespace file could be calculated, it is quicker to keep the information in the density map. Also, once the file is registered and the index table is put into the control file, a record key is needed to find the index table.

The program control packet contains miscellaneous information that describes the file. For example, the miscellaneous information may include historical information that describes the history of file changes.

The bit map 114 is the bit map for cell 0 and tracks those records in cell 0 that are available and those records in cell 0 that are allocated. In each of the other cells, the bit map occupies the first record of the cell.

The available space entry 116 indicates the amount of unallocated space remaining in cell 0 after control structures are allocated.

The layout of a cell that has a fragmented index table, for example cell 1116, is illustrated by block 120. The bit map 122 of the cell occupies the first record, the fragmented index table 124 occupies the next record, and the remaining records in the cell are the usable space 126, where each record is either available or allocated. The cells not having a fragmented index table, for example, cell 2231, include a bit map 132 in the first record, and the remaining records are the usable space 134 in the cell.

Figure 2:
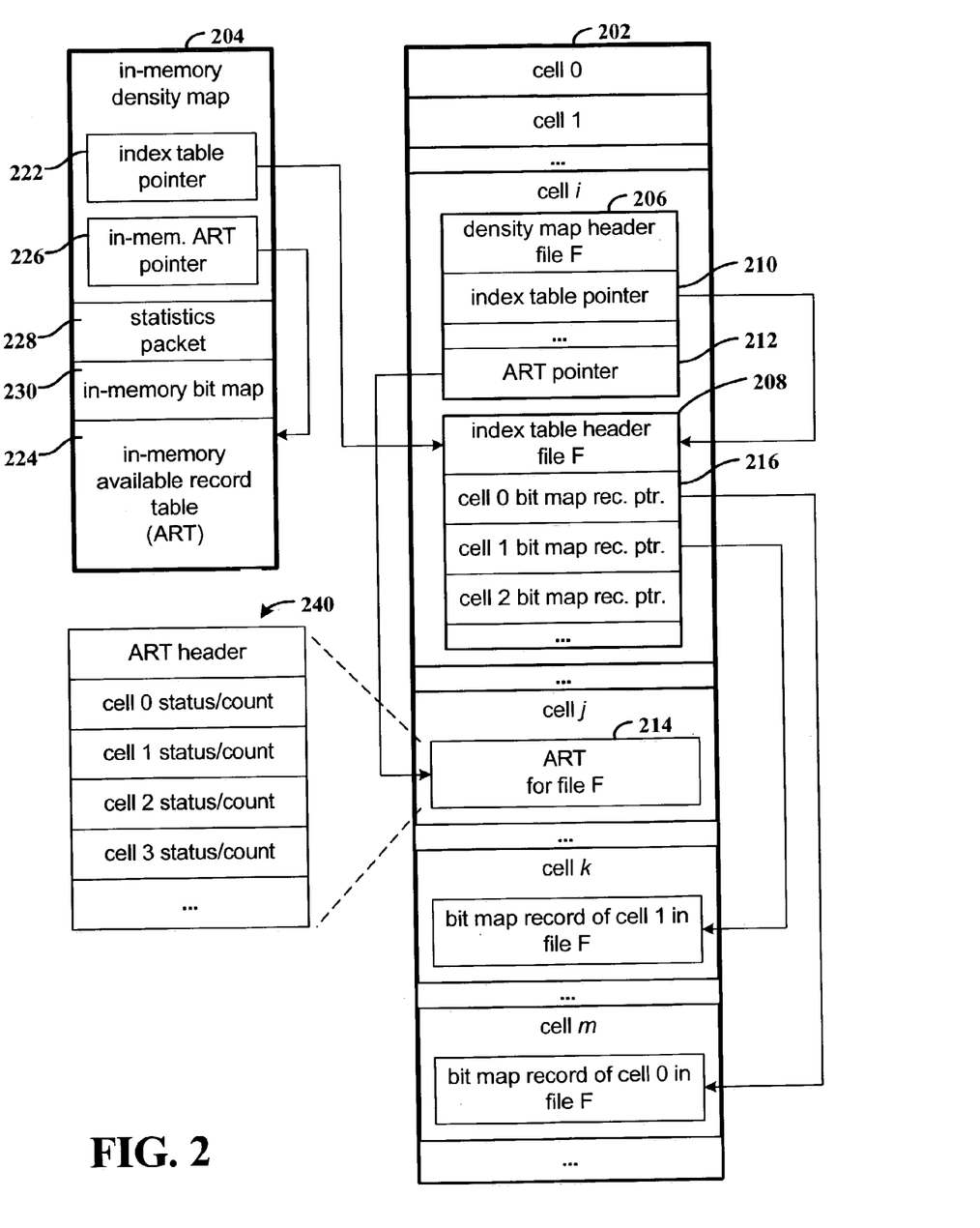
FIG. 2 is a block diagram that illustrates in-memory control structures and the control file that are used in managing one or more freespace files.

FIG. 2 is a block diagram that illustrates in-memory control structures and the control file that are used in managing one or more freespace files. Control file 202 is the file in which the management information is stored, and control block 204 is the in-memory structure for the management information. The control file has almost the same structure as other freespace files before any other freespace files are registered. It has in its cell 0 the control structures (not shown) used to manage the control file as a freespace file, for example, a header, density map, index table, statistics packet, program control packet, and bit map for cell 0. Each cell in the control file (besides cell 0) has a bit map as the first record to control allocations for the cell. The index table for the control file contains pointers to the bit maps that belong to the control file.

When a freespace file F is registered and its control blocks are read from the file F and written into the control file, space is allocated in the control file for file F's index table, bit maps and density map. The pointers in the control file's copy of the index table for file F are updated to point to the locations of the bit maps in the control file. An entry is made in one of the structures that is unique to the control file, called the file-list record. The file-list record keeps a record of each file that is registered. The data that is recorded for each file includes the file number and a pointer (record key of) to the density map that exists for file F in the control file.

A density map and an index table are maintained in the control file for each freespace file. For example, density map 206 and index table 208 are maintained for file F. The density map includes a pointer 210 to the index table for file F and a pointer 212 to the available record table (ART) 214 for file F in the control file.

Each entry in the index table 208 points to a location in the control file 202 at which is stored a bit map that describes an associated cell in the freespace file F. For example, pointer 216 references the bitmap for cell 0 of file F, and the bitmap is stored in cell m. The bit maps for file F are stored in both the control file and in the first record of the respective cells in file F. The operating system does not reference the control structures in the freespace file during non-maintenance operations nor for many maintenance operations. A maintenance operation generally refers to changing any file attributes of a freespace file. The control structures in the freespace file are updated from the copies in the control file when the file is deregistered.

In-memory control block 204 contains an index table pointer 222 and available record table (ART) 224, which at the time the file is brought online (made available for allocations by applications) are copies of the corresponding data from the control file 202. In order to allow applications access to a freespace database file F, two separate operations are performed. The file is registered with the freespace system, for example, by a systems analyst (SA), which causes the control blocks to be brought into the control file. The SA then "onlines" the file, which causes certain control information to be brought into memory. The online function allows applications to allocate records and perform other data accesses to the file. A freespace file that is registered, but has not been brought online, cannot be accessed by an application.

The index table pointer 222 references the index table in the control file, and the ART 224 is initially a copy of ART 214. ART 224 is referenced by ART pointer 226, which is also in the in-memory control structure. While not shown, it should be understood that the in-memory density map also contains a pointer to the control file version of the ART 214. The statistics packet 228 stores statistics that relate to file activity. The in-memory bit map 230 is the bit map of a cell that is being currently used for allocation requests for this freespace file on this host. All allocations are performed against the in-memory bit map. This allows the bit map to be kept up-to-date in the memory copy. While the bit map is in-memory, the ART has the bit map marked as in-memory on host X, or just in-memory for a single host system. When an allocation request is received that cannot be satisfied by the available records in the cell described by the in-memory bit map, a bit map of another cell is selected as the new in-memory bit map, and the current in-memory bit map is written back to the control file. The status of the in-memory bit map is changed to reflect the number of available records of the cell, the new bit map is copied into memory from the control file, and the corresponding ART entry is updated to indicate that the bit map is in-memory.

Block 240 is an expanded view of the example ART 214 for file F. Each entry in the ART contains either a status code or a value that indicates a number of available basic records in an associated cell in the freespace file. The status indicates whether the bit map is available for selection as the next in-memory bit map. If the bit map is unavailable, the status also indicates the reason. For example, the user can change the status of the bit map to DOWN, or a process of deferred release may be working with it's own in-memory copy of a bit map, in which case the bit map status is LOCKED BY RELEASE PROCESSING. The bit map may also be marked IN-MEMORY or IN-MEMORY-HOST X, if it is in the in-memory copy of the file's control blocks.

Figure 3:
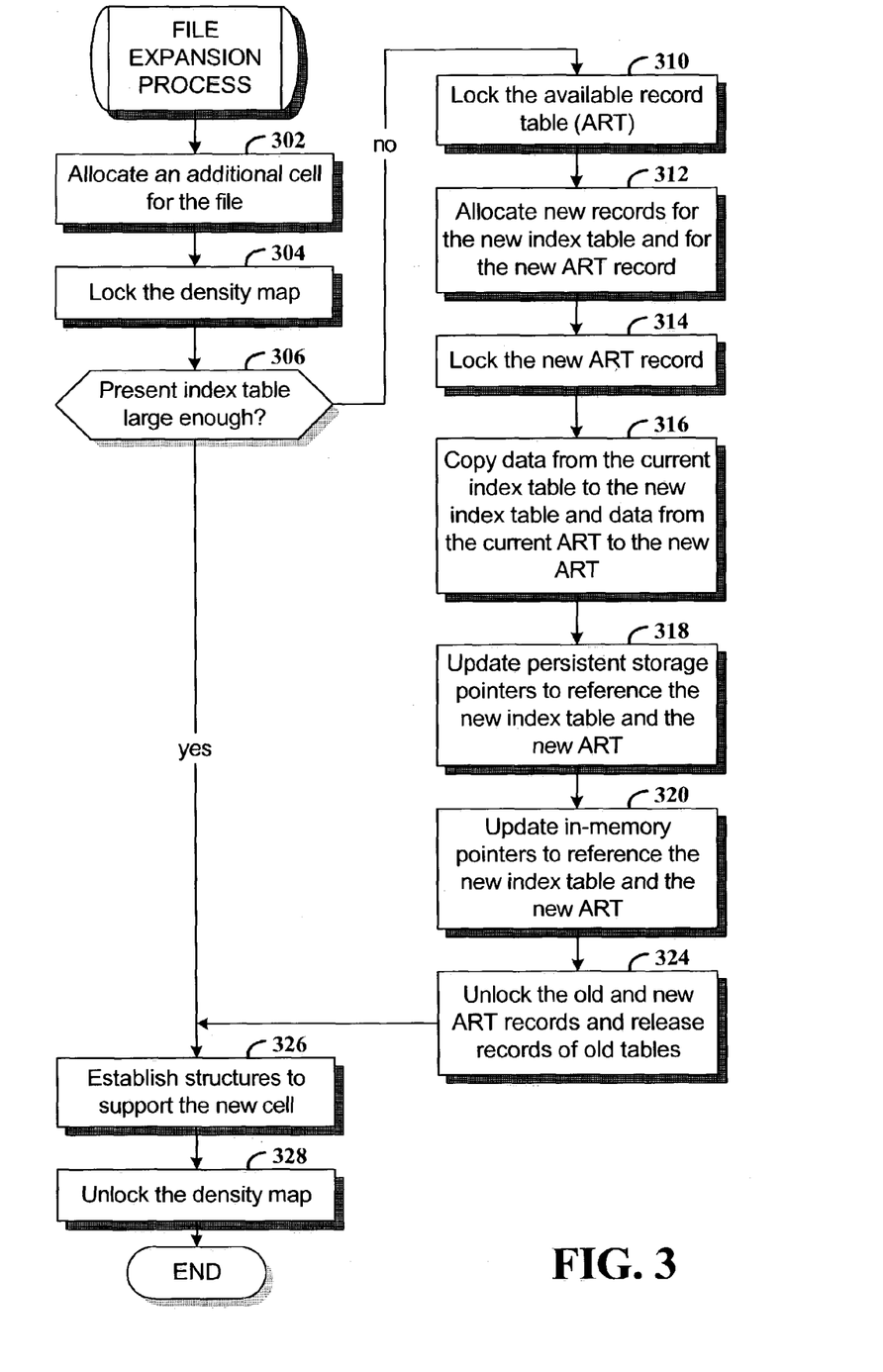
FIG. 3 is a flowchart of an example process for expanding usable storage in a freespace file.

FIG. 3 is a flowchart of an example process for expanding usable storage in a freespace file. The process begins by allocating an additional cell for the file (step 302). The control file density map 206 is locked for any necessary management operations (step 304) because before making any change that affects information stored in the density map, the density map must be locked to avoid lost data or corruption. The entire density map is read into memory, updated and written back to the control file. If simultaneous updates were allowed, even to different pieces of data within the density map, updates would be lost. Example operations that lock the density map include expansion and contraction of the freespace file, definition of a new freespace record type, change to the fragmentation control settings for the freespace file, change to settings that control how releases are applied to the file, bringing a file online, taking a file offline and other operations. If the present size of the index table, for example index table 208, is not large enough to reference the additional cell (decision step 306), the process proceeds to expand the index table and ART by initially locking the control file ART 214 (step 310).

In one embodiment of a multi-host file sharing arrangement, locks are communicated and enforced between hosts with a separate file caching and locking arrangement such as the Extended Processing Complex (XPC) system from Unisys. When a user locks a record of a file that is shared by multiple hosts, the XPC handles the lock. Any other user will be queued on the lock if an attempt is made to lock the same record, even if the user is executing on a different host. The interface to the user is the same as that used on a single host system. The difference is that on a single host system the operating system handles locks, and on a shared file in a multi-host system the XPC handles locks.

Figure 4A:
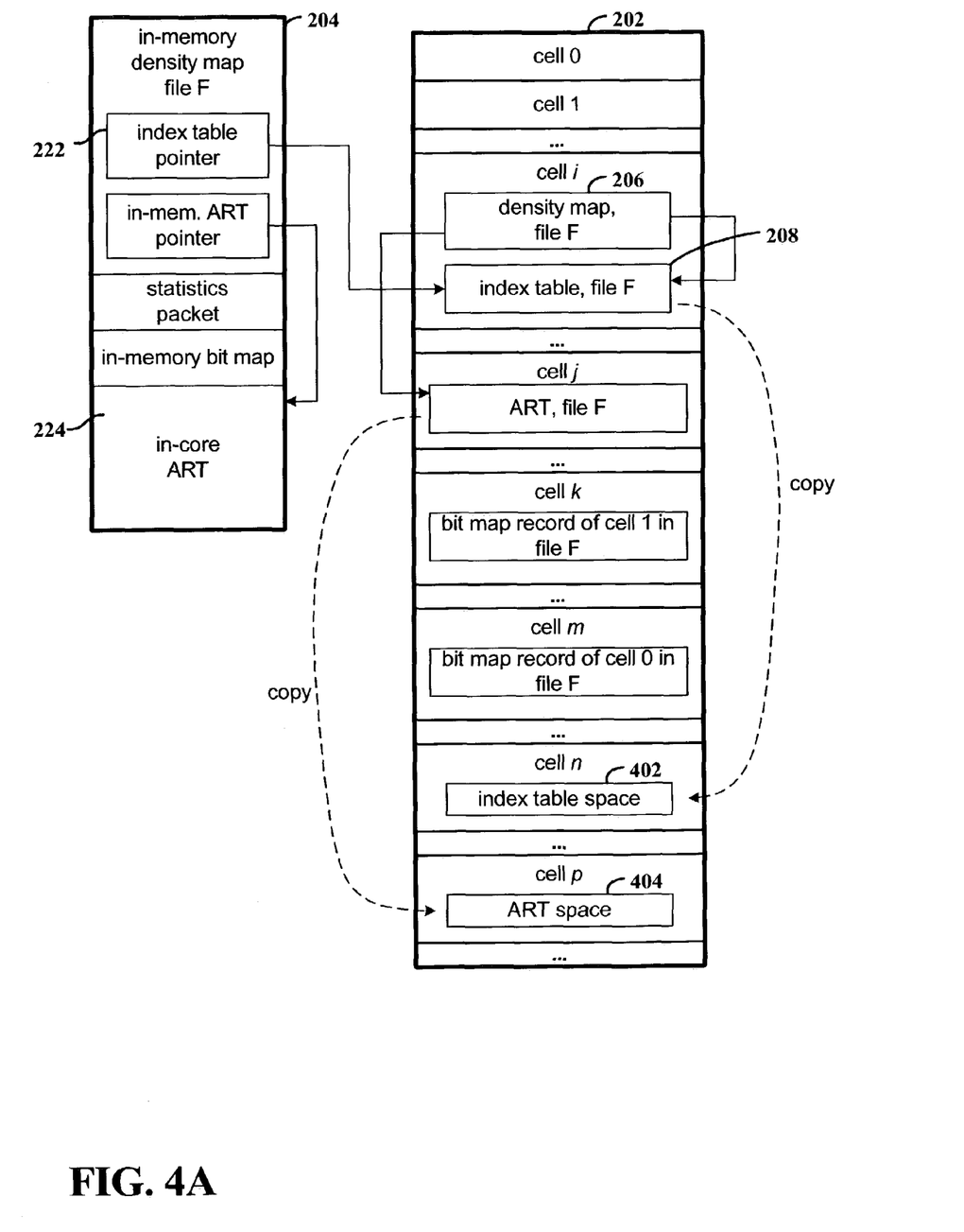
FIG. 4A is a block diagram that illustrates allocation of new space in the control file for an expanded index table and new space for an expanded available record table.
Figure 4B:
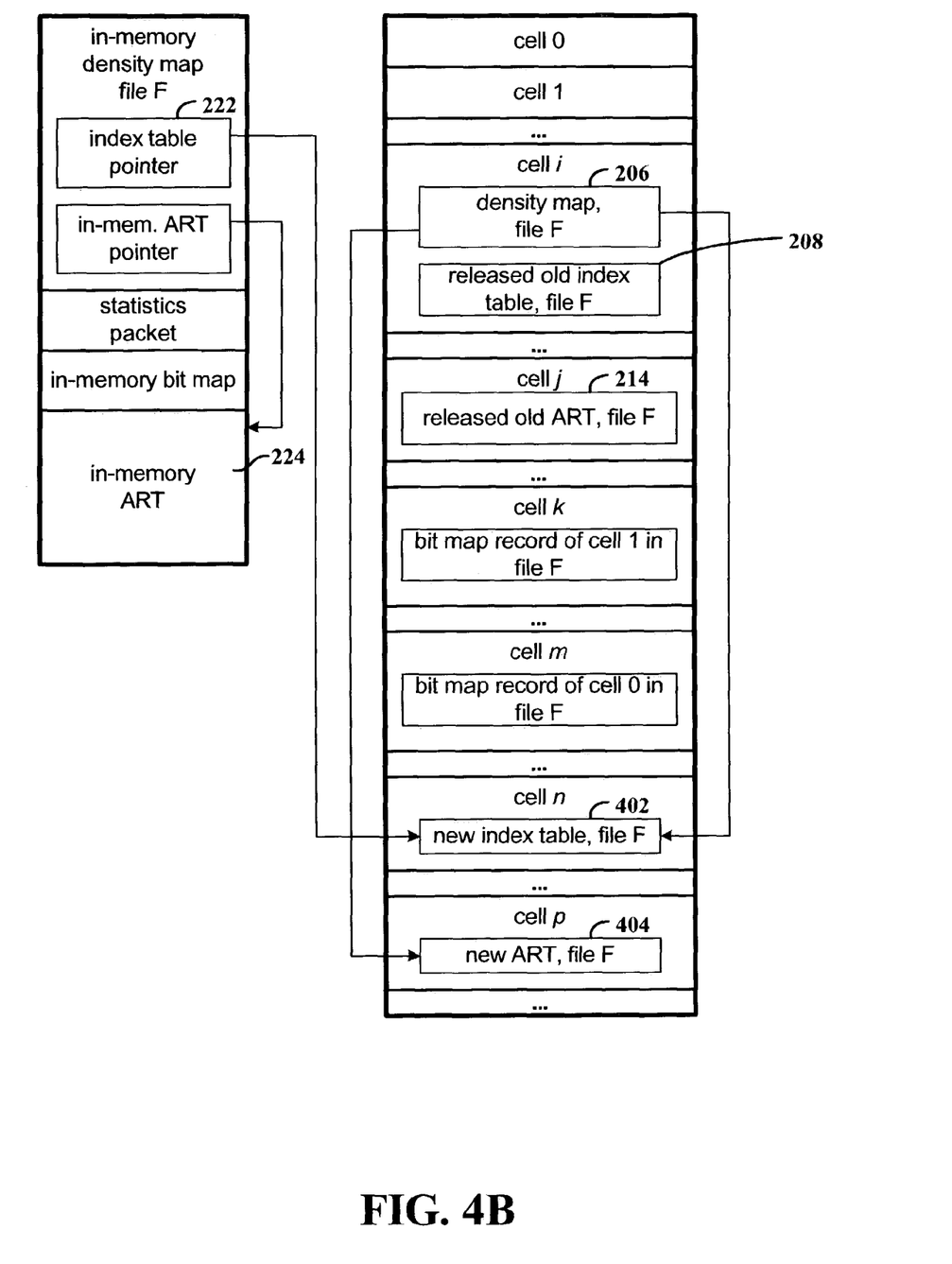
FIG. 4B is a block diagram that illustrates pointers having been changed to reference a new index table and new available-record table.

FIGS. 4A and 4B are introduced here to illustrate the file expansion process as applied to the freespace file F. FIG. 4A is a block diagram that illustrates allocation of new space in the control file for an expanded index table and new space for an expanded ART, and FIG. 4B is a block diagram that illustrates pointers having been changed to reference the new index table and new available-record table.

Returning now to FIG. 3, additional records are allocated in the control file for a larger index table and a larger ART (step 312). For example, in control file 202 of FIG. 4A, records are allocated in cell n for the new index table 402, and records in cell p are allocated for the new ART 404. The new ART 404 is locked, and data is copied from the current index table 208 to the new index table 402 and from the current ART 214 to the new ART 404 (step 316). There is no need to lock the index table because the locks on the density map and ART protects the index table. The updates to the control file concerning the pointer to the index table and the location of the index table are protected by the lock on the density map since the address of the index table may only be found from the pointer in the density map. If other applications or processes are queued on the lock of the density map, the index table cannot be referenced until the lock is released. The lock on the density map is maintained throughout expansion of a freespace file in order to protect the index table. The index table can be quite large and is not referenced frequently. Thus, when a pointer to a bit map is needed, the corresponding word of the index table is read into memory.

The in-memory pointer to the index table 222 (in the in-memory density map) is protected by the lock on the ART. References to the index table pointer in memory are made under the protection of the ART lock. It will be appreciated, however, that a different locking protocol could be implemented to include locking the index table when updates to it (or its location) are made.

The index table pointer in density map 206 is updated to reference the new index table 402, and the ART pointer in the density map is updated to reference the new ART 404 (step 318). FIG. 4B illustrates the updated pointers. The in-memory index table pointer 222 is also updated to reference the new index table (step 320), and the in-memory pointer (not shown) to the control file ART is updated to reference the new ART 404.

After the pointers have been updated, the old and new ARTs are unlocked, and the records of the old index table 208 and old ART 214 are released (step 324).

New entries in the index table and ART are established for the new cell (step 326) once there is sufficient space in the tables from being newly allocated, or as already is present in the tables. The density map is unlocked (step 328) once the entries for the index table and ART have been established, thereby completing the process. It will be appreciated that the ART is unlocked before the density map to prevent a deadlock from occurring.

The locking of the density map and ART during file expansion does not prevent general access to the freespace file. Thus, applications (and therefore database users) may continue to allocate and release records, while the file is being updated. Locking the density map and the ART does not prevent access to the in-memory copy of the bit map. Access to the in-memory copy of the bit map is what is required to allocate records. Freeing records is also allowed when the density map and ART are locked as supported by a buffering system that is used to release records. In the buffering system, a copy of the release request is kept and applied to the file later. The lock on the ART prevents a new bit map from being selected as the new in-memory bit map when the current in-memory bit map is full. As long as there is room in the in-memory bit map record allocations may continue. Also, releases can be applied to the in-memory bit map, assuming the file allows immediate releases. Otherwise releases are buffered (held until later although to the user it appears the release is complete). Maintenance functions (online, offline, changing file attributes) are not allowed, and the in-memory bit map cannot be swapped for a different bit map. In addition, other maintenance functions that occur concurrently with the expansion must finish properly. For example, swapping the in-memory bit map, changing the status of a bit map (by user request or by deferred release processing). A maintenance function must not be allowed to start with the old set of pointers while the expansion process is expanding the file and changing the pointers.

Figure 5:
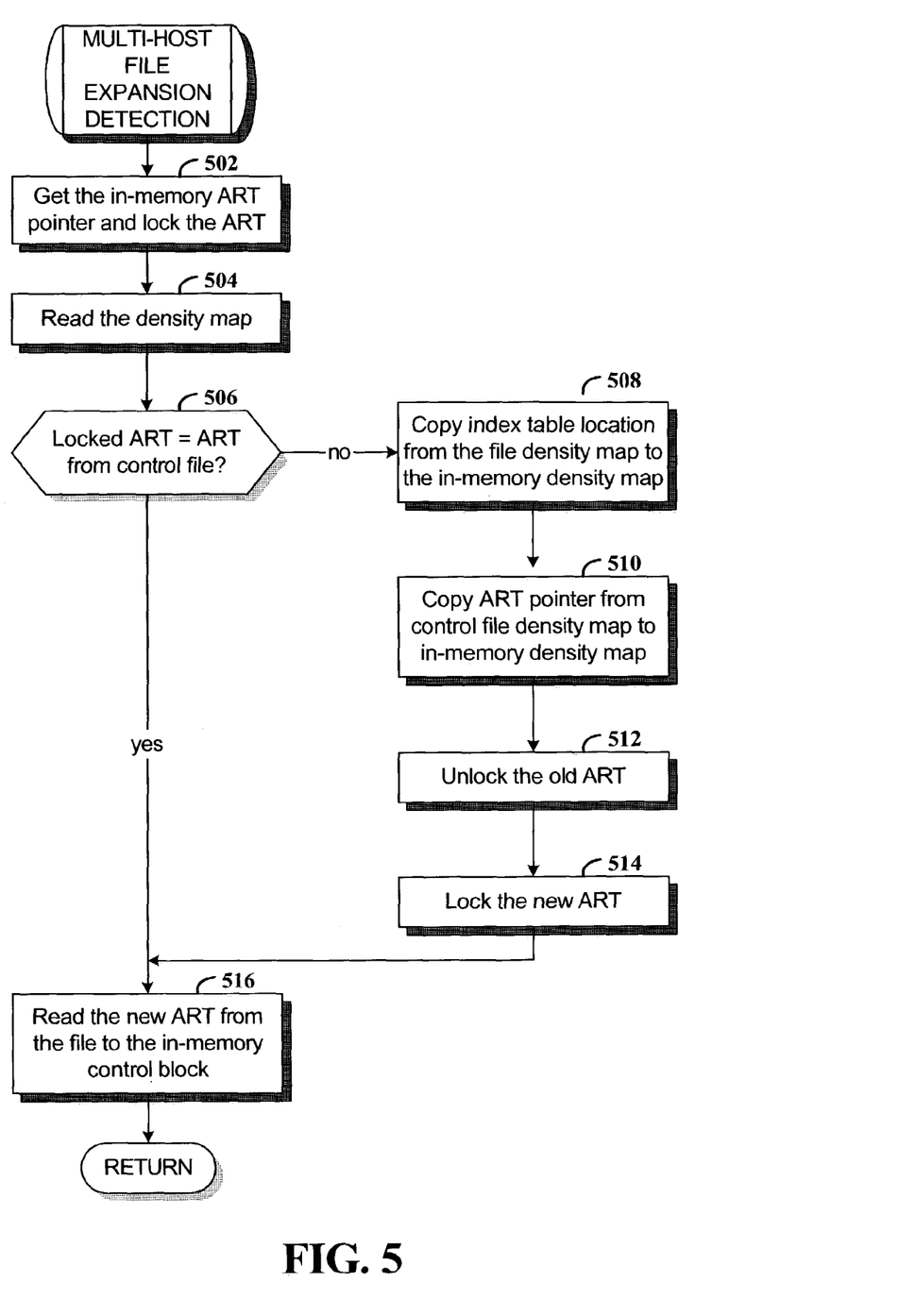
FIG. 5 is a flowchart of an example process that may be used in multi-host file sharing arrangements for detecting expansion of a freespace file by a host other than the host that expanded the file and updating the file management information accordingly.

FIG. 5 is a flowchart of an example process that may be used in multi-host file sharing arrangements for detecting expansion of a freespace file by a host other than the host that expanded the file and updating the file management information accordingly. Freespace files may be shared by applications that are hosted in different data processing systems. A host data processing system, or "host", may be viewed as a processor, memory, input/output and storage arrangement that is managed by an instance of an operating system. Because a shared freespace file may be expanded on one host, the other hosts require a mechanism to detect the expansion and update the respective control files and in-memory control structures accordingly.

The process for detecting file expansion is invoked on each host when the host has a need to reference a pointer in the index table or an entry in the ART. Thus, if a request is queued on a lock of the ART at the time of the expansion, processing of the request will verify that the pointers are current before using the pointers.

Each host executes the process of FIG. 5 in order to detect whether another host has expanded a shared freespace file. The in-memory pointer to the ART in the control file is referenced and the corresponding record in the control file is locked (step 502). The density map 206 is then read from the control file (step 504).

If the in-memory pointer to the ART is not equal to the ART 404 referenced by the density map in the control file (decision step 506), then the freespace file has been expanded, and the local control structures must be updated.

This may be determined by comparing the in-memory version of the pointer (in density map 204) to the ART (214) in the control file (202), to the control file version of the pointer to the ART in the control file. The pointer to the control file index table is copied from the control file density map 206 to the in-memory index table pointer 222 (step 508). The pointer to the new ART (e.g., ART 404, FIG. 4B) is copied from the control file density map to the in-memory density map (204) (step 510). The old ART is then unlocked (step 512), and the new ART 404 is locked (step 514). Whether the freespace file has or has not been expanded, the referenced ART is read from the control file to the in-memory control block (step 516).

In one embodiment, a process is provided to determine whether all hosts in a multi-host arrangement implement the process for detecting dynamic expansion of a freespace file. This may be useful in an arrangement where it is unfeasible to require that all hosts implement the process for detecting dynamic expansion and it is unknown which hosts support the feature. A host that implements the feature determines to proceed to dynamically expand the file only if it first determines that all hosts sharing the file are able to detect dynamic expansion.

When a request is made to expand a freespace file on a multi-host arrangement and that expansion requires the dynamic expansion algorithm, a message is sent to each host in the multi-host system. The message queries whether the host is able to detect dynamic expansion. If the host is able to detect dynamic expansion, the host returns a success status code. However, if the host does not detect dynamic expansion, the message would not be recognized and an error status code would be returned. If any host returns an error status code, the file must be deregistered to be expanded.

In an alternative embodiment, a host that supports dynamic expansion sends an inter-host message to each of the other hosts at the beginning of each session of the operating system. The message queries whether the other host supports dynamic file expansion. A flag may be updated to indicate whether or not dynamic expansion is allowed based on the responses from the other hosts. However, this alternative method would require another query each time a host in the multi-host system went down and was rebooted.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for expanding usable space for an application data file, comprising:

maintaining in a control file first and second control structures and first and second pointers to the first and second control structures, respectively, for the data file, wherein the first structure includes a plurality of pointers that respectively reference a plurality of bit maps that indicate available and allocated records of respective portions of usable space in the data file, and the second structure contains respective values that indicate quantities of available space in the respective portions of the data file;

limiting access to the first and second control structures to only a process that is expanding the data file while the process is expanding the data file;

allocating space for new versions of the first and second control structures in the control file;

copying contents of the first and second control structures to space for the new versions of the first and second control structures;

updating the first and second pointers to reference the new versions of the first and second control structures;

determining whether the first structure is large enough to accommodate expansion of the data file by a requested amount; and performing the steps of allocating, copying, and updating only if the first structure is not large enough to accommodate expansion of the data file by the requested amount;

maintaining in-memory copies of the first and second pointers while the application data file is available for access; and updating the in-memory copies of the first and second pointers to reference the new versions of the first and second control structures.

2. The method of claim 1, wherein in a multi-host data processing arrangement for sharing the application data file, the method further comprises, after a first host completes expanding the data file, transmitting a message from the first host to each other host, wherein the message indicates that the file has been expanded.

3. The method of claim 1, wherein a plurality of application programs share the data file and are hosted on a plurality of host data processing systems (hosts), the method further comprising conditioning expansion of a file shared by the application program on whether each host is configured to detect expansion of the data file by another host.

4. The method of claim 3, further comprising, before expanding the data file by a first host, sending to each other host a message that queries whether the other host is configured to detect expansion of the data file by another host.

5. A computer-implemented method for expanding usable space for an application data file, comprising:

maintaining an in-memory copy of one or more selected control structures from a control file while the application data file is available for access, wherein the application file is logically divided into a plurality of equal-size cells, and each cell provides storage for one or more records of data;

maintaining in the control file a first structure that contains pointers to second and third structures in the control file, wherein the second structure includes a plurality of pointers that respectively reference bit maps of the cells of the application file, each bit map indicating available and allocated records in the cell, and the third structure contains respective values that indicate quantities of available space in the cells, and;

determining whether the second structure is large enough to accommodate expansion of the data file by a requested amount;

in response to the second structure not being large enough to accommodate expansion of the data file by the requested amount, performing the steps of, locking the first and third structures within the control file;

allocating in the control file space for a fourth structure and space for a fifth structure, wherein the space allocated for the fourth structure is greater than space occupied by the second structure, and the space allocated for the fifth structure is greater than space occupied by the third structure;

copying data from the second structure to the fourth structure and data from the third structure to the fifth structure;

updating in the first structure respective pointers to the second and third structures to reference the fourth and fifth structures, respectively; and unlocking the first structure and the third structure after the pointers have been updated;

wherein in a multi-host data processing arrangement for sharing the application data file, the method further comprises, after a first host completes expanding the data file, transmitting a message from the first host to each other host, wherein the message indicates that the file has been expanded;

wherein each host receiving a message that indicates that a file has been expanded, performs the steps of, locking the in-memory version of the third structure;

updating the in-memory versions of the pointers to the control file versions of the second and third structures, with the control file versions of the pointers to the control file versions of the second and third structures;

copying the contents of the third structure in the control file to the in-memory version of the third structure; and unlocking the third structure after copying is complete.

6. The method of claim 5, wherein a plurality of application programs share the data file and are hosted on a plurality of host data processing systems (hosts), the method further comprising conditioning expansion of a file shared by the application program on whether each host is configured to detect expansion of the data file by another host.

7. The method of claim 6, further comprising, before expanding the data file by a first host, sending to each other host a message that queries whether the other host is configured to detect expansion of the data file by another host.

8. An apparatus for expanding usable space for an application data file, comprising:

means for maintaining an in-memory copy of one or more selected control structures from a control file while the application data file is available for access, wherein the application file is logically divided into a plurality of equal-size cells, and each cell provides storage for one or more records of data;

means for maintaining in the control file a first structure that contains pointers to second and third structures in the control file, wherein the second structure includes a plurality of pointers that respectively reference bit maps of the cells of the application file, each bit map indicating available and allocated records in the cell, and the third structure contains respective values that indicate quantities of available space in the cells, and;

means for determining whether the second structure is large enough to accommodate expansion of the data file by a requested amount;

means, responsive to the second structure not being large enough to accommodate expansion of the data file by the requested amount, for locking the first and third structures within the control file;

for allocating in the control file space for a fourth structure and space for a fifth structure, wherein the space allocated for the fourth structure is greater than space occupied by the second structure, and the space allocated for the fifth structure is greater than space occupied by the third structure;

for copying data from the second structure to the fourth structure and data from the third structure to the fifth structure;

for updating in the first structure respective pointers to the second and third structures to reference the fourth and fifth structures, respectively; and for unlocking the first structure and the third structure after the pointers have been updated;

means, responsive to a request that references an entry in the in-memory version of the third structure, for locking the third structure;

for comparing a control file version of the pointer to the control file version of third structure, to an in-memory version of the pointer to the control file version of the third structure;

for updating the in-memory versions of the pointers to the control file versions of the second and third structures, with the control file versions of the pointers to the control file versions of the second and third structures, if the control file version and in-memory version of the pointer are not equal;

for copying the contents of the third structure in the control file to the in-memory version of the third structure; and for unlocking the third structure after the copying of the contents of the third structure.

9. An apparatus for expanding usable space for an application data file, comprising:

means for maintaining in a control file first and second control structures and first and second pointers to the first and second control structures, respectively, for the data file, wherein the first structure includes a plurality of pointers that respectively reference a plurality of bit maps that indicate available and allocated records of respective portions of usable space in the data file, and the second structure contains respective values that indicate quantities of available space in the respective portions of the data file;

means for determining whether the first structure is large enough to accommodate expansion of the data file by a requested amount; and means, responsive to the first structure not being large enough to accommodate expansion of the data file by the requested amount,
 for limiting access to the first and second control structures to only a process that is expanding the data file while the process is expanding the data file;
 for allocating space for new versions of the first and second control structures in the control file;
 for copying contents of the first and second control structures to space for the new versions of the first and second control structures; and
 for updating the first and second pointers to reference the new versions of the first and second control structures;

means for maintaining in-memory conies of the first and second pointers while the application data file is available for access; and means for updating the in-memory copies of the first and second pointers to reference the new versions of the first and second control structures.

10. An article of manufacture for expanding usable space for an application data file, comprising:
 a computer-readable storage medium configured with instructions that cause a processor-based system to perform the steps of,
 maintaining in a control file first and second control structures and first and second pointers to the first and second control structures, respectively, for the data file, wherein the first structure includes a plurality of pointers that respectively reference a plurality of bit maps that indicate available and allocated records of respective portions of usable space in the data file, and the second structure contains respective values that indicate quantities of available space in the respective portions of the data file;
 limiting access to the first and second control structures to only a process that is expanding the data file while the process is expanding the data file;
 allocating space for new versions of the first and second control structures in the control file;
 copying contents of the first and second control structures to space for the new versions of the first and second control structures; and
 updating the first and second pointers to reference the new versions of the first and second control structures;
 determining whether the first structure is large enough to accommodate expansion of the data file by a requested amount;
 performing the steps of allocating, copying, and updating only if the first structure is not large enough to accommodate expansion of the data file by the requested amount;
 maintaining in-memory copies of the first and second pointers while the application data file is available for access; and
 updating the in-memory copies of the first and second pointers to reference the new versions of the first and second control structures.

11. The article of manufacture of claim 10, wherein in a multi-host data processing arrangement for sharing the application data file, the computer-readable medium is further configured with instructions that cause a processor-based system to perform the step of transmitting a message from the first host to each other host after a first host completes expanding the data file, wherein the message indicates that the file has been expanded.

12. The article of manufacture of claim 10, wherein a plurality of application programs share the data file and are hosted on a plurality of host data processing systems (hosts), and the computer-readable medium is further configured with instructions that cause a processor-based system to perform the step of conditioning expansion of a file shared by the application program on whether each host is configured to detect expansion of the data file by another host.

13. The article of manufacture of claim 12, wherein the computer-readable medium is further configured with instructions that cause a processor-based system to perform the step of, before expanding the data file by a first host, sending to each other host a message that queries whether the other host is configured to detect expansion of the data file by another host.

* * * * *